(12) United States Patent
Yanagawa et al.

(10) Patent No.: US 12,723,620 B2

(45) Date of Patent: Sep. 1, 2026

(54) FLUID DYNAMIC BEARING SYSTEM AND SPINDLE MOTOR HAVING SUCH A BEARING SYSTEM

(71) Applicant: Minebea Mitsumi Inc., Nagano-ken (JP)

(72) Inventors: Atsushi Yanagawa, Nagano (JP); Andreas Kull, Donaueschingen (DE); Thomas Fuss, Rottweil (DE)

(73) Assignee: Minebea Mitsumi Inc., Nagano-ken (JP)

( * ) Notice: Subject to any disclaimer, the term of this patent is extended or adjusted under 35 U.S.C. 154(b) by 29 days.

(21) Appl. No.: 18/465,646

(22) Filed: Sep. 12, 2023

(65) Prior Publication Data

US 2025/0084896 A1 Mar. 13, 2025

(51) Int. Cl.
*F16C 17/10* (2006.01)
*F16C 17/04* (2006.01)

(52) U.S. Cl.
CPC .......... *F16C 17/107* (2013.01); *F16C 17/045* (2013.01)

(58) Field of Classification Search
CPC .... F16C 17/107; F16C 17/045; F16C 33/107; F16C 33/1085; F16C 2360/46; F16C 2370/12
See application file for complete search history.

(56) References Cited

U.S. PATENT DOCUMENTS

| | | | | |
|---|---|---|---|---|
| 5,810,479 | A * | 9/1998 | Miyasaka | F16C 17/026 384/107 |
| 7,101,084 | B2 | 9/2006 | Gomyo | |
| 9,903,415 | B2 * | 2/2018 | Yeh | F04D 29/0513 |
| 2003/0016891 | A1 | 1/2003 | Gomyo et al. | |
| 2005/0238267 | A1 * | 10/2005 | Nakamura | F16C 33/1085 384/107 |
| 2006/0088233 | A1 | 4/2006 | Ando et al. | |
| 2007/0014496 | A1 * | 1/2007 | Engesser | F16C 17/107 384/107 |
| 2008/0298731 | A1 | 12/2008 | Hino et al. | |

FOREIGN PATENT DOCUMENTS

| | | | |
|---|---|---|---|
| DE | 10 2004 040 295 | B4 | 3/2017 |
| JP | 2010-169240 | A | 8/2010 |
| WO | WO 2005/113995 | A2 | 12/2005 |

* cited by examiner

*Primary Examiner* — John Olszewski
*Assistant Examiner* — Aimee Tran Nguyen
(74) *Attorney, Agent, or Firm* — Wolf, Greenfield & Sacks, P.C.

(57) ABSTRACT

The invention relates to a fluid dynamic bearing system, comprising a bearing bush and a shaft rotatably supported in the bearing bush, wherein an annular pressure plate is arranged at the shaft and wherein a bearing gap is formed which is filled with a bearing fluid, and wherein at least one fluid dynamic axial bearing is formed between an end face of the pressure plate and an end face of a cover plate, wherein the fluid dynamic axial bearing has groove structures provided on the pressure plate or the cover plate wherein, in the connection or junction region between the shaft and the pressure plate, at least one axially extending recess or hole is present, wherein the opening of the recess or hole of the pressure plate and the groove structure of the axial bearing do not overlap in the radial direction.

18 Claims, 4 Drawing Sheets

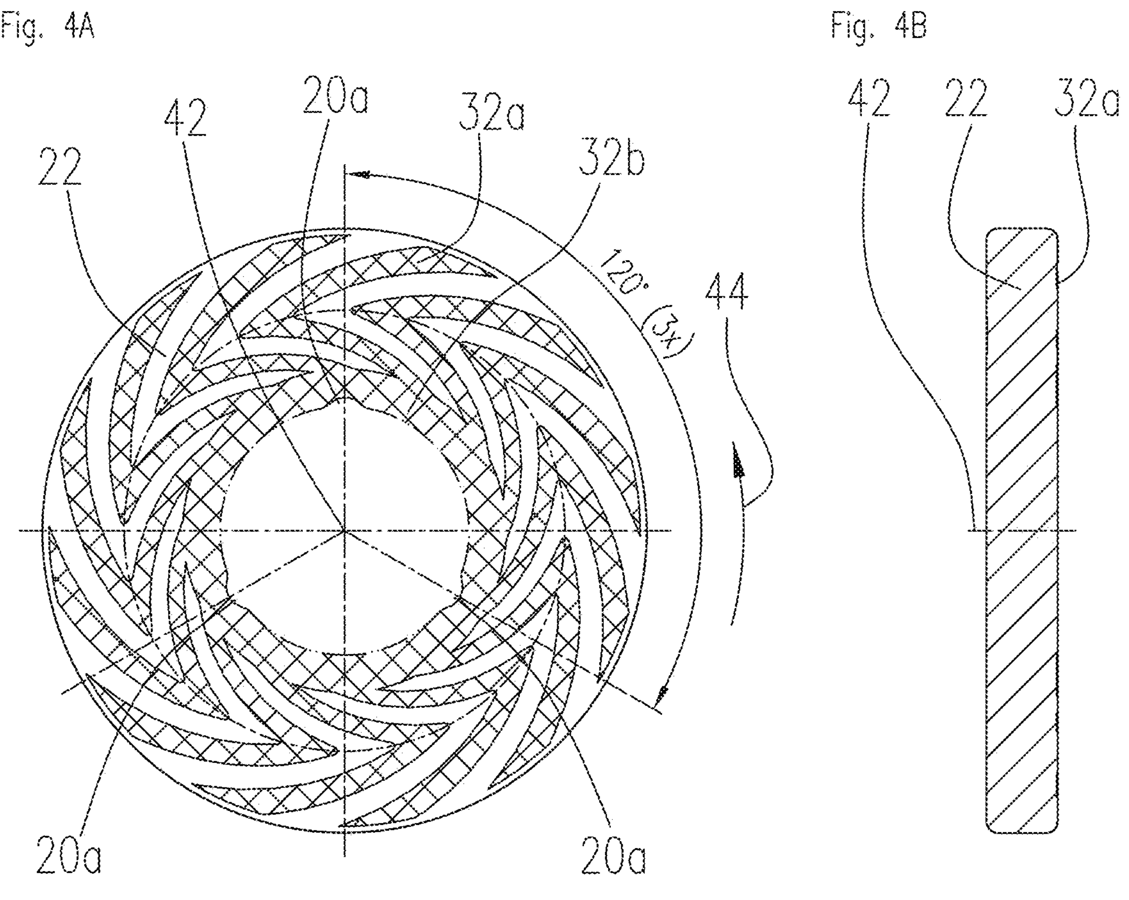
Fig. 4A
20a
42
32a
22
32b
120° (3x)
44
20a
20a
Fig. 4B
42
22
32a
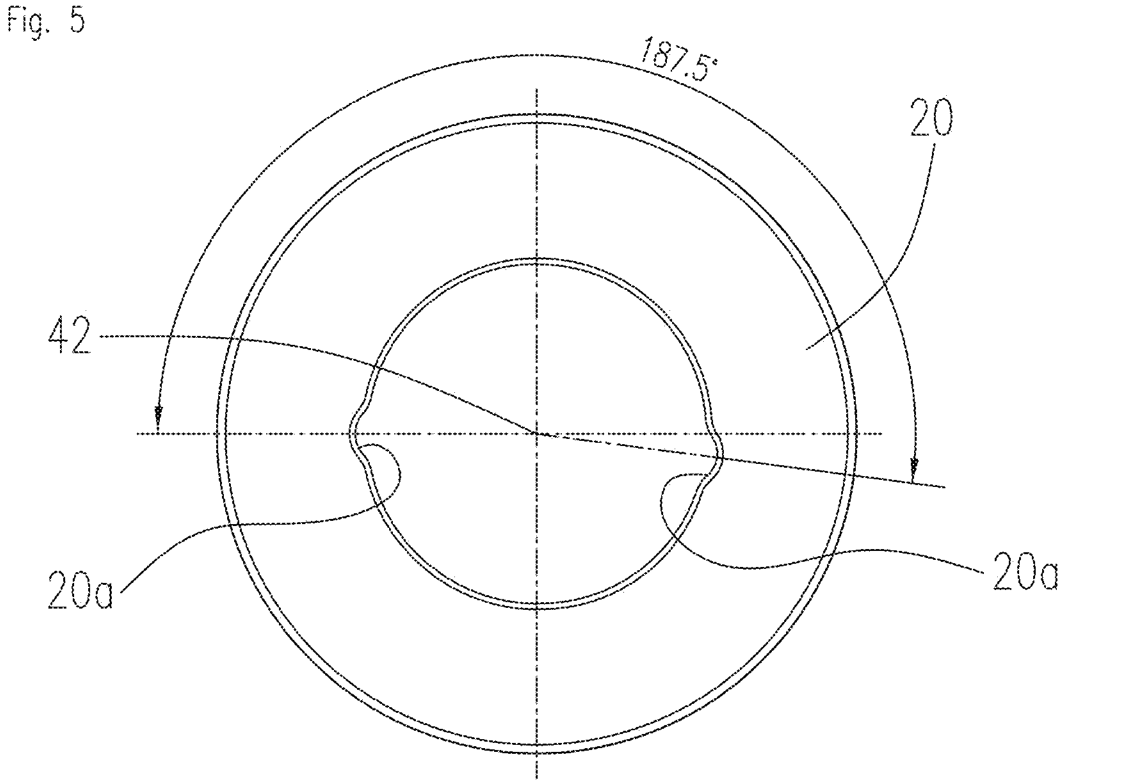
Fig. 5
187.5°
20
42
20a
20a 20a
127.5°
20
42
20a
20a
105°

20a
195°
97.5°
20
42
20a
67.5°
20a
20a

FLUID DYNAMIC BEARING SYSTEM AND SPINDLE MOTOR HAVING SUCH A BEARING SYSTEM

The invention relates to a fluid dynamic bearing system and a spindle motor having such a bearing.

DE 10 2004 040 295 B4 discloses, in FIG. 1A to 4B, a generic fluid dynamic bearing system, comprising a shaft rotatably supported in a bearing bush. At one end of the shaft, an annular pressure plate is fixed, for example, by means of a press fit, which, together with the shaft, rotates in a recess of the bearing bush provided for that purpose. A bearing gap filled with a bearing fluid is formed between the bearing components rotatable with respect to each other. The surfaces of the shaft and the bearing bush facing each other form two fluid dynamic radial bearings. The two end faces of the pressure plate, together with opposing end faces of the bearing bush and a cover plate, form two fluid dynamic axial bearings the bearing forces of which act in opposite directions. The fluid dynamic radial bearings and axial bearings comprise groove structures which generate the required hydro dynamic pressure within the bearing gap when the bearing system is rotating.

To improve circulation of the bearing fluid in the region around the pressure plate, preferably axially extending recesses are provided on the inner diameter of the pressure plate facilitating exchange of the bearing fluid between the two end faces of the pressure plate. The pressure plate can also be integrally formed with the shaft wherein, in this case, axial holes are provided in the pressure plates instead of recesses, ensuring circulation of the bearing fluid.

Fluid dynamic bearing systems of a similar structure are also described in US 2006/0088233A and US 2003/0016891 A1.

The recesses or holes in the pressure plate can lead to a number of problems. If the number of recesses or holes has a common divisor with the number of bearing grooves of the fluid dynamic axial bearing, e.g. 3 recesses vs. 12 bearing grooves, resonances will result as soon as the openings of the recesses or holes of the rotating pressure plate move across the bearing grooves. The resonances will be noticeable as acoustic noise. Since the number of bearing grooves cannot be changed at will without having to change the bearing properties, one provisional step was to increase the number of recesses to 5, for example, to prevent resonances. However, a greater number of recesses weakens the press fit between the shaft and the pressure plate, and results in weaker pressure forces.

It is the object of the present invention, in a fluid dynamic bearing system of the initially mentioned type, to keep the number of recesses or holes in the pressure plate as low as possible and to avoid acoustic vibrations of the bearing system.

The object is achieved by a fluid dynamic bearing system, comprising a bearing bush and a shaft rotatably supported in the bearing bush, wherein an annular pressure plate is arranged at one end of the shaft, the pressure plate being rotatable together with the shaft in a recess of the bearing bush provided for that purpose, and wherein a bearing gap is formed between these bearing components rotatable with respect to each other, the bearing gap being filled with a bearing fluid, and wherein the surfaces of the shaft and the bearing bush facing each other form two fluid dynamic radial bearings and wherein at least one end face of the pressure plate, together with the opposite end face of the cover plate, forms at least one fluid dynamic axial bearing which has groove structures provided on an end face of the pressure plate or an end face of the cover plate or on both components, wherein, in the connection or junction region between the shaft and the pressure plate, at least one axially extending recess or hole is present.

In accordance with a first embodiment of the invention it is provided that the opening of the recess or hole of the pressure plate and the groove structure of the axial bearing do not overlap in the radial direction.

Accordingly, it is suggested, taking the rotary axis of the bearing system as a point of origin, to arrange the groove structure on a larger radius than the openings of the recess or hole, so that the opening and the groove structure do not radially overlap. By these means, the flow of the bearing fluid out of the opening or into the opening of the recess or hole is not obstructed by the groove structure of the axial bearing. In particular, a movement of the opening of the recess or the hole across the individual grooves of the groove structure and the generation harmonic resonance during the rotation of the bearing system is avoided.

In a preferred embodiment of the invention, the opening of the recess or hole is opposite an annular groove present in the end face of the bearing bush or the end face of the cover plate. The groove facilitates the inflow/outflow of bearing fluid into the opening of the recess or hole.

Preferably, this annular groove communicates with the grooves of the groove structure of the fluid dynamic axial bearing so that the groove structure transports the bearing fluid, for example, towards the annular groove and from there into the opening of the recess or hole.

To facilitate manufacture of the fluid dynamic axial bearing, it is preferably provided for the groove structure of the fluid dynamic axial bearing and the annular groove to have the same depth and to be produced in the same work process, for example by means of electro chemical machining (ECM).

Preferably, the pressure plate and/or the shaft include two or more recesses or holes distributed over an imaginary circular line. If the shaft and the annular pressure plate are present as separate parts, the recesses can be situated either on the inner circumference of the pressure plate or on the outer circumference of the shaft or on both parts. Corresponding holes are used if the pressure plate is integrally formed with the shaft.

In accordance with a second embodiment of the invention, it is provided that at least two recesses or holes are situated along a circular line of the pressure plate in a manner at least partially irregularly distributed, and form different angles between them.

Due to the irregular distribution of the recesses or holes, harmonic resonance is suppressed in the interaction with the groove structure of the fluid dynamic axial bearing even if the number of grooves of the axial bearing and the number of recesses or holes have a common divisor.

It is thus possible, for example, when the number of grooves of the axial bearing is 12, for the number of recesses or holes to be 3, wherein this number of recesses or holes is well suited both in view of the circulation of the bearing fluid and the pressure force of the joint between the shaft and the pressure plate.

In a preferred embodiment of the invention, for an angle between two adjacent recesses or holes, the following applies:

$$\alpha = (360^\circ/(4 * \text{number of grooves of groove structure})) + (360^\circ/\text{number of recesses or holes})$$

Preferably, the number of recesses or holes used on the pressure plate is 2 to 4.

According to the present invention, the features of the first and second embodiments of the invention can be used together, i.e., at least two recesses or holes can be irregularly distributed along a circular line and can form different angles between them, and, additionally, the openings of the recesses or holes and the groove structure of the axial bearing do not overlap in the radial direction.

The features of the dependent claims can also be applied to both embodiments of the invention.

The invention also relates to a spindle motor comprising one of the above described embodiments of a fluid dynamic bearing system.

The invention will be explained in more detail in the following in relation to a number of exemplary embodiments with reference the drawings. Further features and advantages of the invention will be derived therefrom. In the drawings:

FIG. 4A shows a top view of a cover plate having a groove structure in an embodiment of the invention;

FIG. 4B shows a sectional view of the cover plate of FIG. 4A;

FIG. 5 shows a top view of a pressure plate with two irregularly spaced inside recesses;

Figure 1:
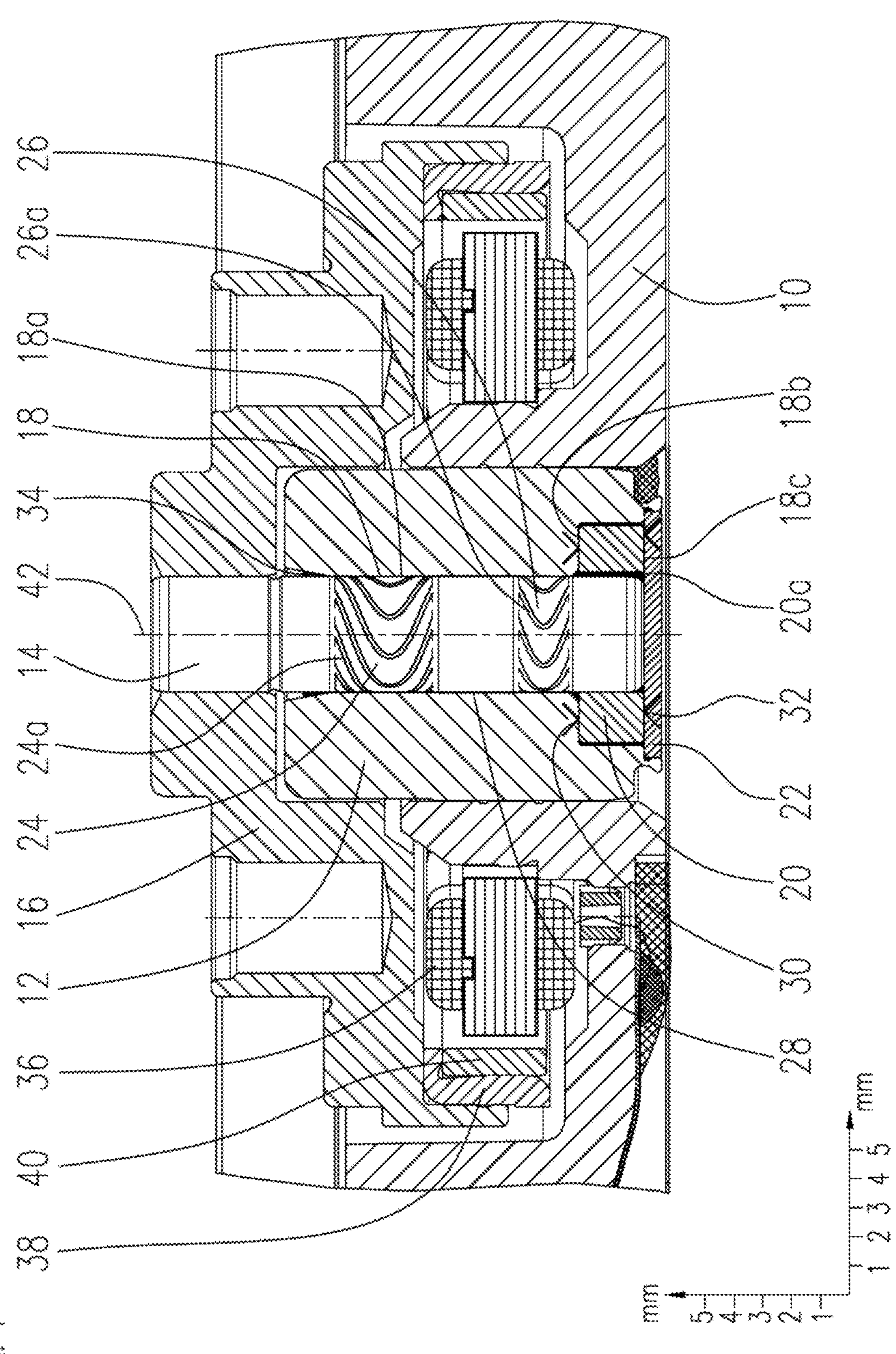
FIG. 1 shows a sectional view of the spindle motor in accordance with an embodiment of the invention.

FIG. 1 shows a sectional view of a spindle motor rotatably supported by means of a fluid dynamic bearing system according to the present invention. The spindle motor comprises a stationary base plate 10 having a cylindrical opening in which a bearing bush 12 is fixed. The bearing bush 12 comprises an axial, cylindrical bearing bore in which a shaft 14 is rotatably received. A bearing gap 18 filled with a bearing fluid, such as a bearing oil, is provided between the internal diameter of the bearing bore and the somewhat smaller external diameter of the shaft 14. Bearing surfaces of the bearing bush 12 and the shaft 14 facing each other together form two fluid dynamic radial bearings 24, 26 characterized by groove structures 24*a*, 26*a*. The groove structures 24*a*, 26*a* are disposed on the surface of the bearing bush 12 or on the surface of the shaft 14 or on both surfaces. As soon as the shaft 14 rotates within the bearing bush 12, the groove structures 24*a*, 26*a* of the radial bearings 24, 26 exert a pumping action on the bearing fluid present in the respective axial section of the bearing gap 18. This generates a hydro dynamic pressure within the bearing gap 18 resulting in a homogeneous and uniformly thick lubrication film within the bearing gap 18 making the radial bearings 24, 26 capable of bearing a load. As long as the shaft 14 rotates within the bearing bore, it is stabilized by the fluid dynamic pressure generated by the groove structures 24*a*, 26*a* of the radial bearings 24, 26 and runs without contact in the bearing bore, separated by the bearing gap 18. The two radial bearings 24, 26 are axially spaced from each other by a region having an increased bearing gap width, the so-called separator gap 28.

The groove structures 24*a* of the top radial bearing 24 are preferably asymmetrically formed, i.e., they do no generate a pumping action of the same strength in the two directions of the axial section 18*a* of the bearing gap 18, but a directed pumping action primarily directed downwards towards the second radial bearing 26.

The second radial bearing 26 comprises groove structures 26*a* which are, for example, symmetrically formed so that the second radial bearing 26 generates a pumping action on the bearing fluid having the same strength in both directions of the axial section of the bearing gap 18. The influence of the top radial bearing 24 generates a pumping action of the bearing fluid in the bearing gap 18 downwards towards a pressure plate 20.

The pressure plate 20 is arranged at one end of the shaft 14 and is pressed onto the shaft 14 or, alternatively, integrally formed with the shaft 14. The pressure plate 20 rotates together with the shaft 14 in a corresponding recess of the bearing bush 12. The bearing bush is closed off by a cover plate 22 below the pressure plate 20. Both the pressure plate 20 and the cover plate 22 are received in corresponding recesses of the bearing bush 12 in a manner concentric with the bearing bore. The surfaces of the pressure plate 20 are separated from the surfaces of the bearing bush 12 and the cover plate 22 by the bearing gap 18 filled with the bearing fluid. A top end face of the pressure plate 20 together with an opposite end face of the bearing bush 12 form a first fluid dynamic axial bearing 30. A bottom end face of the pressure plate 20 together with an opposite end face of the cover plate 22 form a second fluid dynamic axial bearing 32. The two axial bearings 30, 32 are characterized by axial bearing grooves disposed on the bearing surfaces of the pressure plate 20 or bearing surfaces of the bearing bush 12 and bearing surfaces of the cover plate 22, respectively. The axial bearing grooves can be in the shape of spiral grooves or in a herringbone pattern.

As soon as the shaft 14 is made to rotate within the bearing bush 12, the axial bearing grooves of the first axial bearing 30 exert a pumping action on the bearing fluid present in a radial section 18*b* of the bearing gap 18. A hydro dynamic pressure builds up in the top radial section 18*b* of the bearing gap 18 so that the first axial bearing 30 becomes capable of bearing a load. At the same time, the axial bearing grooves 32*a* of the second axial bearing 32 exert a pumping action on the bearing fluid present in a second radial section 18*c* of the bearing gap 18. A hydro dynamic pressure builds up in the radial section 18*c* of the bearing gap 18 so that the axial bearing 32 becomes capable of bearing a load. The two axial bearings 30, 32 work against each other in the sense that the bearing forces generated by the axial bearings 30, 32 are axially opposed so that the pressure plate 20 is positioned centrally in the recess provided by the bearing bush 12.

The open end of the bearing gap 18 is sealed off by a seal, such as a capillary sealing gap 34. The sealing gap 34 is formed by an outer circumferential surface of the shaft 14 and an inner circumferential surface of the bearing bush 12. The inner circumferential surface of the bearing bush 12 is preferably chamfered so that the sealing gap 34 has an essentially conical cross-section. The sealing gap 34 is in direct communication with the bearing gap 18 and is proportionally filled with bearing fluid.

The free end of the shaft 14 is connected to a hub 16. The hub 16 is formed in accordance with the purpose of the spindle motor and, in the present example, is made of aluminum. If the spindle motor is intended as the drive of a hard-disk drive, one or more storage disks (not shown) of the hard-disk drive will be arranged and fixed on the hub 16. Furthermore, the spindle motor can be used to drive a fan propeller or a laser scanner.

An annular rotor magnet 40 comprising a plurality of permanent magnetic pole pairs is arranged on an internal, lower edge of the hub 16. The rotor magnet 40 is adjacent to a magnet yoke ring 38. This magnet yoke ring 38 can optionally be omitted if the hub 16 is made of ferromagnetic steel. Radially opposite the rotor magnet 40 a stator assembly 36 is fixed on the base plate 10 and separated from the rotor magnet 40 by a radial air gap. The stator assembly 36 includes respective stator windings which, when powered, generate a rotating electromagnetic field so that the rotor, consisting of the hub 16, the shaft 14 and the pressure plate 20, is rotated.

Figure 2:
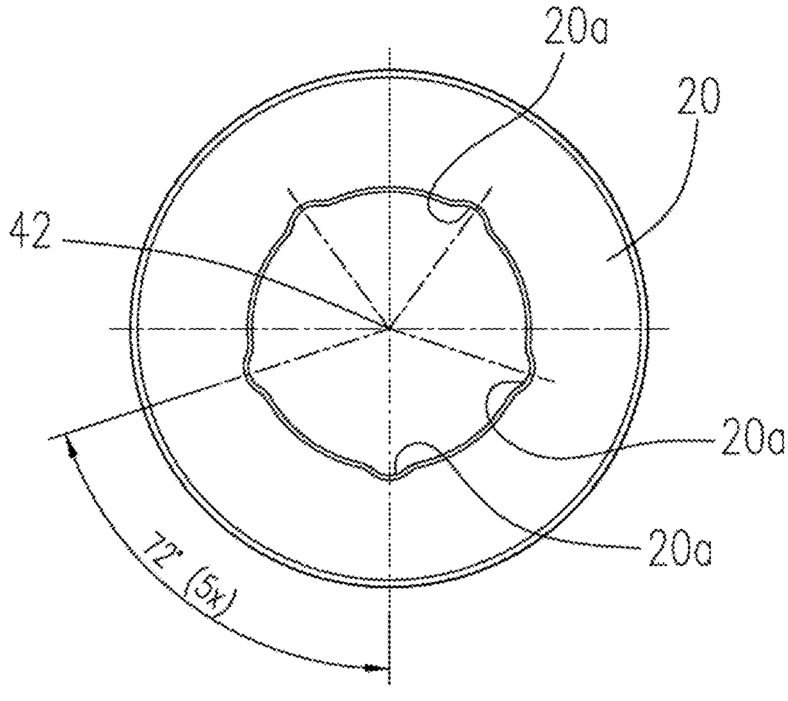
FIG. 2 shows a top view of a pressure plate with inside recesses.

FIG. 2 shows a view of a pressure plate 20 of a well-known structure, which has an annular design and is fixed on the outer circumference of the shaft 14 preferably by means of a press fit. At its inner circumferential surface, the pressure plate 20 has a plurality of recesses 20*a* distributed over the inner circumference. When the pressure plate 20 is mounted on the shaft 14, due to the recesses 20*a*, through openings are left between the two end faces of the pressure plate 20. The bearing fluid can circulate through these through openings between the two radial sections 18*b*, 18*c* of the bearing gap 18.

Figure 3:
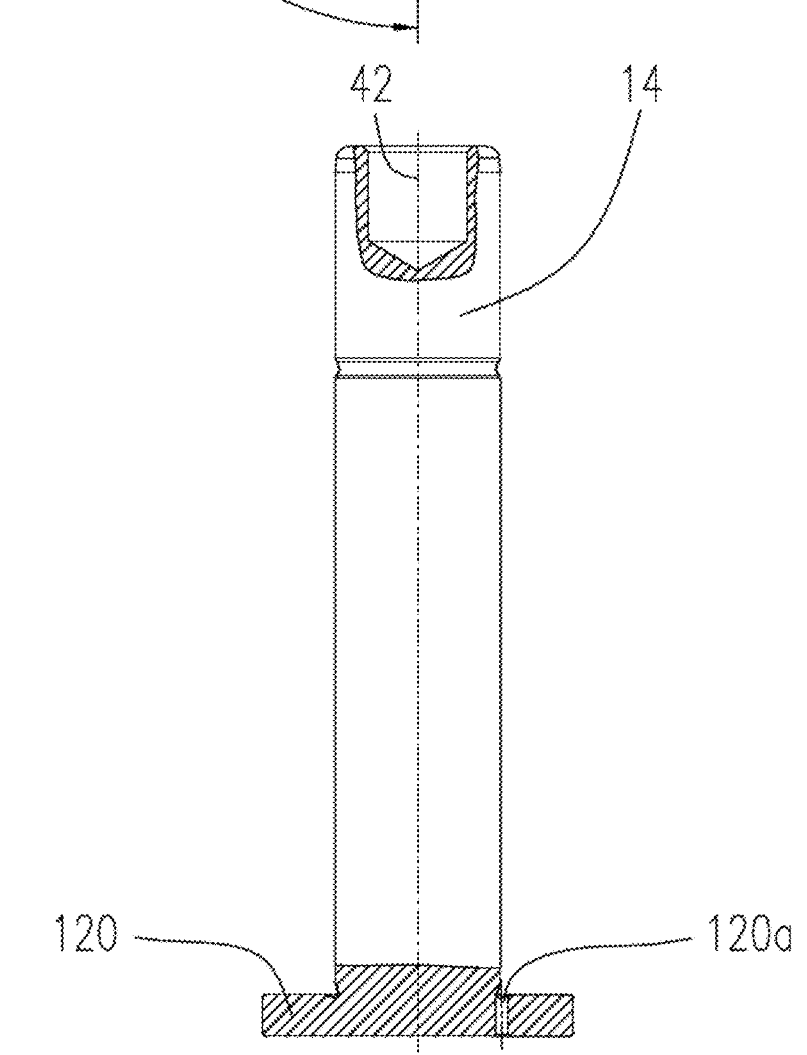
FIG. 3 shows a partial sectional view of a shaft with an integral pressure plate and a hole in the pressure plate.

FIG. 3 shows a pressure plate 120 integrally formed with the shaft 14. This pressure plate 120 has one or more holes 120*a* which form a through opening between the two end faces of the pressure plate 120. FIGS. 4A and 4B show a cover plate 22 in a possible embodiment of the invention. The cover plate 22 is opposed to the underside of the pressure plate 20 and includes an annular bearing surface having groove structures 32*a* which, together with a bottom bearing surface of the pressure plate 20, form the second fluid dynamic axial bearing 32. The groove structures 32*a* consist of 12 herringbone-shaped grooves having "arrow heads" pointing in the direction of rotation 44 of the pressure plate 20 rotating across it. The groove structures 32*a* are continued at the level of the internal diameter of the pressure plate 20 in the form of an annular depression 32*b*. The annular depression 32*b* has the same depth as the grooves of the groove structures 32*a*, such as 10 micrometers. The position of the shaft 14 and the position of the openings of the recesses 20*a* of the overlying pressure plate 20 are indicated. It can be seen that the, for example, three openings of the recesses 20*a* do not radially overlap with the groove structures 32*a* and the non-structured, raised regions of the axial bearing 32.

This arrangement of the groove structures 32*a* and the recesses 20*a* allows a movement of the openings of the recesses 20*a* across the grooves of the groove structures 32*a* and resonances arising due to the rotating frequency of the groove structures $f_R$=n $f_L$ and the rotating frequency of the openings $f_O$=m $f_L$ to be avoided during the rotation of the pressure plate 20, wherein n is the number of grooves 32*a* of the axial bearing 32 and m is the number of recesses 20*a* of the holes in the pressure plate 20. $f_L$ refers to the rotating frequency of the bearing system.

Figure 6:
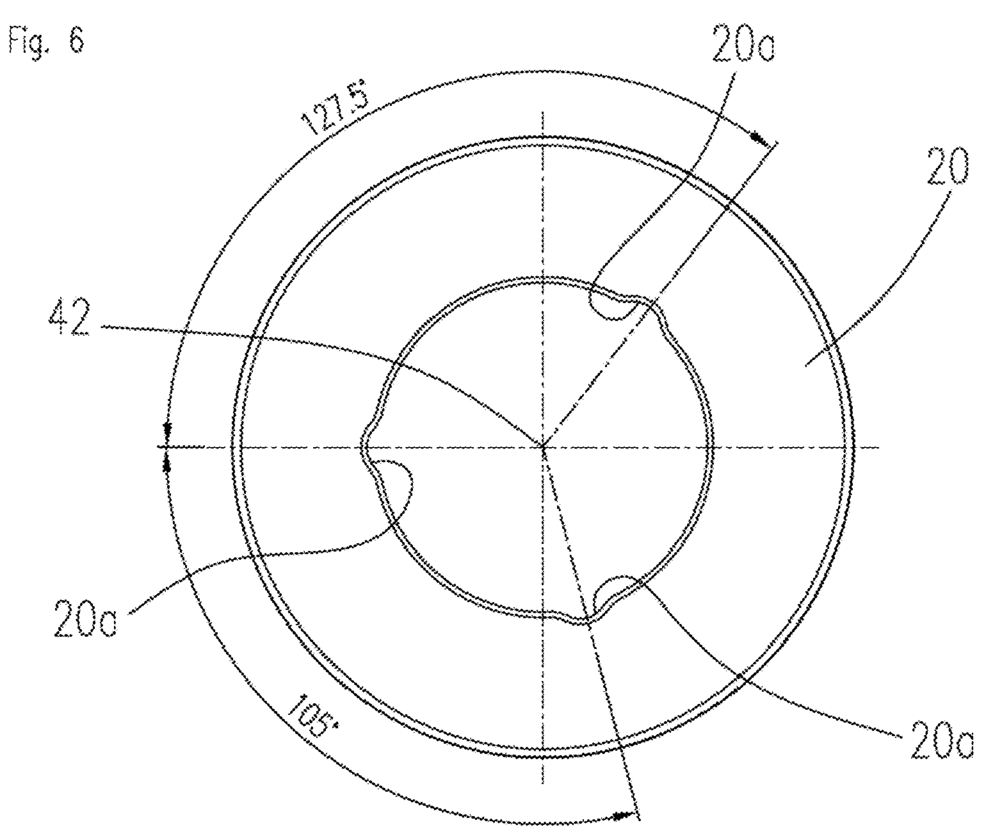
FIG. 6 shows a top view of a pressure plate with three irregularly spaced inside recesses.
Figure 7:
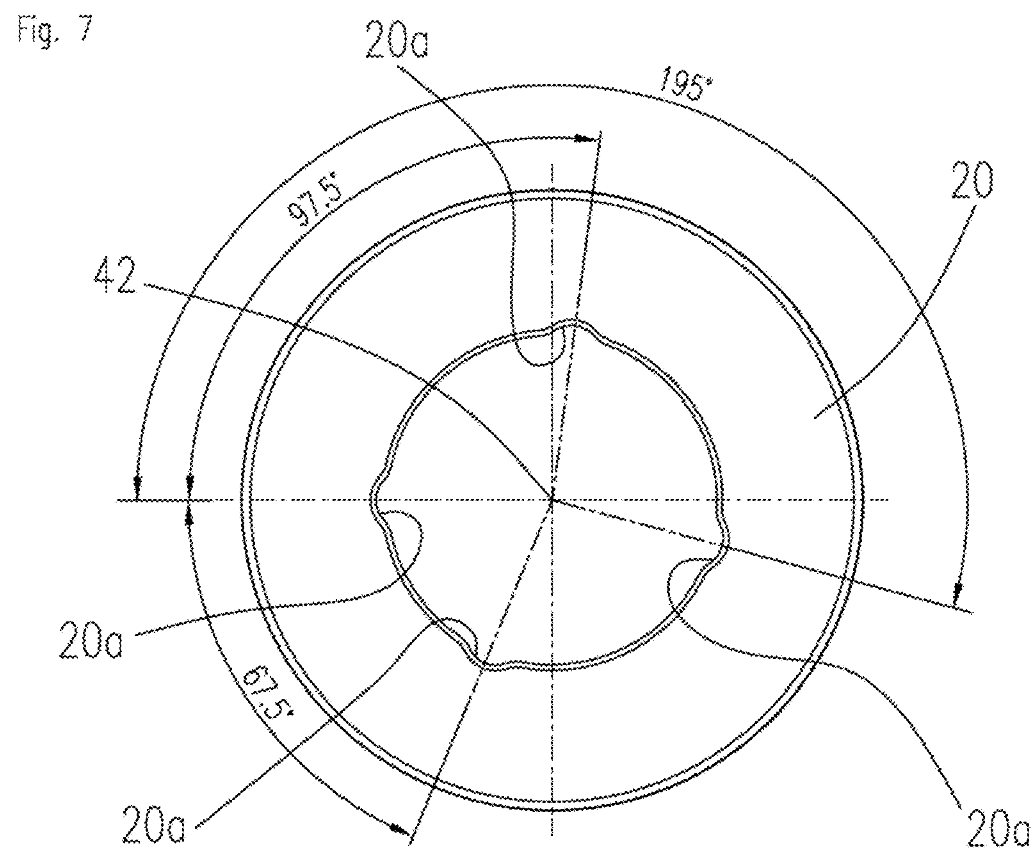
FIG. 7 shows a top view of a pressure plate with four irregularly spaced inside recesses.

FIGS. 5 to 7 show an alternative or additional step for the avoidance of resonance and acoustic vibrations. In accordance with this embodiment of the invention, a plurality of recesses 20*a* are provided on the inner circumference of the pressure plate 20, which are, however, irregularly spaced about the inner circumference.

FIG. 5 shows a pressure plate 20 having two recesses 20*a* not disposed at the same angle of 180° to each other, but forming an angle of 187.5° and 172.5°, respectively, about the rotary axis 42.

FIG. 6 discloses a pressure plate 20 having three recesses 20*a* not disposed at the same angle of 120° to each other, but the recesses 20*a* are disposed at an angle of 127.5° with respect to each other, wherein the third and first recesses 20*a* form an angle of 105° with each other.

FIG. 7 shows a pressure plate 20 having four recesses 20*a* not disposed at the same angle of 90° to each other, but the recesses 20*a* are disposed at an angle of 97.5° with respect to each other, an angle of 67.5° resulting between the fourth and first recesses 20*a*. Due to the irregular distribution of the recesses 20*a* on the inner circumference of the pressure plate 20, the generation of resonances is avoided in the context of the groove structure 32*a* of the axial bearing 32.

It has been found that the angle α between each of two recesses 20*a* or holes 120*a* should preferably have the following magnitude:

$$\alpha = \frac{360°}{4n} + \frac{360°}{m}$$

wherein n is the number of grooves 32*a* of the axial bearing 32 and m is the number of recesses 20*a* or holes 120*a* in the pressure plate 20, 120.

For a shaft 14 having an integral pressure plate 20, as shown in FIG. 3, the holes 120*a* in the pressure plate 120 can also be arranged as distributed about the circumference of the pressure plate 120 at the indicated angles.

According to the invention, irregular spacing of the recesses 20*a* or holes 120*a* in accordance with FIGS. 5 to 7 can be combined with the configuration of the groove structures 32*a* and the annular depression 32*b* of the cover plate 22 in accordance with FIGS. 4A and 4B.

LIST OF REFERENCE NUMERALS

10 base plate
12 bearing bush
14 shaft
16 hub
18 bearing gap
18*a* axial section of bearing gap
18*b* radial section of bearing gap
18*c* radial section of bearing gap
20 pressure plate
20*a* recess
22 cover plate
24 radial bearing
24*a* groove structures
26 radial bearing
26*a* groove structures
28 separator gap
30 axial bearing
32 axial bearing
32*a* groove structures
32*b* annular depression

34 sealing gap
36 stator assembly
38 magnet yoke ring
40 rotor magnet
42 rotary axis
44 direction of rotation of pressure plate
120 pressure plate
120*a* hole

What is claimed is:

1. A fluid dynamic bearing system, comprising a bearing bush and a shaft rotatably supported in the bearing bush, wherein an annular pressure plate is arranged at the shaft, the annular pressure plate being rotatable together with the shaft in a recess of the bearing bush provided for that purpose, and wherein a bearing gap is formed between these bearing components rotatable with respect to each other, the bearing gap being filled with a bearing fluid, and wherein surfaces of the shaft and the bearing bush facing each other form at least one fluid dynamic radial bearing and an end face of the annular pressure plate together with an opposite end face of a cover plate forms at least one fluid dynamic axial bearing, wherein the at least one fluid dynamic axial bearing has groove structures provided on the end face of the annular pressure plate or the end face of the cover plate or on both components, wherein, in a junction region between the shaft and the annular pressure plate, at least two recesses or holes are present which are arranged along a circular line of the annular pressure plate and form different angles between them, wherein the at least two recesses or holes are irregularly spaced and axially extending, wherein an opening of the at least two recesses or holes of the annular pressure plate and the groove structure of the at least one fluid dynamic axial bearing do not overlap in a radial direction, wherein the opening of the at least two recesses or holes of the annular pressure plate is situated opposite an annular depression present in the end face of the cover plate, wherein the groove structure (32*a*) of the at least one fluid dynamic axial bearing and the annular depression have the same depth.

2. The fluid dynamic bearing system according to claim 1, wherein, taking a rotatory axis as a point of origin, the groove structure is situated at a larger radius than the opening of the at least two recesses or holes of the annular pressure plate.

3. The fluid dynamic bearing system according to claim 1, wherein the annular depression communicates with grooves of the groove structure.

4. The fluid dynamic bearing system according to claim 1, wherein the groove structure and the annular depression are made in the same work process.

5. The fluid dynamic bearing system according to claim 1, wherein the at least two recesses or holes are arranged in a manner distributed about a circular line of the annular pressure plate.

6. The fluid dynamic bearing system according to claim 1, wherein, for at least one angle between two adjacent recesses or holes of the at least two recesses or holes, the following applies: $\alpha$=(360°/(4*number of grooves of groove structure (32*a*)))+(360°/number of recesses (20*a*) or holes (120*a*)).

7. The fluid dynamic bearing system according to claim 1, wherein the number of the at least two recesses or holes present in the annular pressure plate is 2 to 4.

8. The fluid dynamic bearing system according to claim 1, wherein the groove structure of the at least one fluid dynamic axial bearing has a number of grooves of between 11 and 13.

9. The fluid dynamic bearing system according to claim 1, wherein the at least two recesses are situated in the annular pressure plate or on an outer circumference of the shaft or on both components.

10. The fluid dynamic bearing system according to claim 1, wherein the at least two holes are situated in the annular pressure plate.

11. A fluid dynamic bearing system, comprising a bearing bush and a shaft rotatably supported in the bearing bush, wherein an annular pressure plate is arranged at the shaft, the annular pressure plate being rotatable together with the shaft in a recess of the bearing bush provided for that purpose, and wherein a bearing gap is formed between these bearing components rotatable with respect to each other, the bearing gap being filled with a bearing fluid, and wherein surfaces of the shaft and the bearing bush facing each other form at least one fluid dynamic radial bearing and an end face of the annular pressure plate together with an opposite end face of a cover plate forms at least one fluid dynamic axial bearing, wherein the at least one fluid dynamic axial bearing has groove structures provided on the end face of the annular pressure plate or the end face of the cover plate or on both components, wherein, in a junction region between the shaft and the annular pressure plate, at least two axially extending recesses or holes are present, wherein the at least two axially extending recesses or holes are arranged along a circular line of the annular pressure plate in an at least partially irregularly distributed manner and form different angles between them.

12. The fluid dynamic bearing system according to claim 11, wherein, for at least one angle between two adjacent recesses or holes of the at least two axially extending recesses or holes, the following applies: $\alpha$=(360°/(4*number of grooves of groove structure (32*a*)))+(360°/number of recesses or holes.

13. The fluid dynamic bearing system according to claim 11, wherein the number of the at least two axially extending recesses or holes present in the annular pressure plate is 2 to 4.

14. The fluid dynamic bearing system according to claim 11, wherein the groove structure of the at least one fluid dynamic axial bearing has a number of grooves of between 11 and 13.

15. The fluid dynamic bearing system according to claim 11, wherein the at least two recesses are situated in the annular pressure plate or on an outer circumference of the shaft or on both components.

16. The fluid dynamic bearing system according to claim 11, wherein the holes are situated in the annular pressure plate.

17. A spindle motor comprising a fluid dynamic bearing system, the fluid dynamic bearing system comprising a bearing bush and a shaft rotatably supported in the bearing bush, wherein an annular pressure plate is arranged at the shaft, the annular pressure plate being rotatable together with the shaft in a recess of the bearing bush provided for that purpose, and wherein a bearing gap is formed between these bearing components rotatable with respect to each other, the bearing gap being filled with a bearing fluid, and wherein surfaces of the shaft and the bearing bush facing each other form at least one fluid dynamic radial bearing and an end face of the annular pressure plate together with an opposite end face of a cover plate forms at least one fluid dynamic axial bearing, wherein the at least one fluid dynamic axial bearing has groove structures provided on the end face of the annular pressure plate or the end face of the cover plate or on both components, wherein, in a junction region between the shaft and the annular pressure plate, at least two recesses or holes are present which are arranged along a circular line of the annular pressure plate and form different angles between them, wherein the at least two recesses or holes are irregularly spaced and axially extending, wherein an opening of the at least two recesses or holes of the annular pressure plate and the groove structure of the at least one fluid dynamic axial bearing do not overlap in a radial direction, wherein the opening of the at least two recesses or holes of the annular pressure plate is situated opposite an annular depression present in the end face of the cover plate, wherein the groove structure of the at least one fluid dynamic axial bearing and the annular depression have the same depth.

18. A spindle motor comprising a fluid dynamic bearing system, the fluid dynamic bearing system comprising a bearing bush and a shaft rotatably supported in the bearing bush, wherein an annular pressure plate is arranged at the shaft the annular pressure plate being rotatable together with the shaft in a recess of the bearing bush provided for that purpose, and wherein a bearing gap is formed between these bearing components rotatable with respect to each other, the bearing gap being filled with a bearing fluid, and wherein surfaces of the shaft and the bearing bush facing each other form at least one fluid dynamic radial bearing and an end face of the annular pressure plate together with an opposite end face of a cover plate forms at least one fluid dynamic axial bearing, wherein the at least one fluid dynamic axial bearing has groove structures provided on the end face of the annular pressure plate or the end face of the cover plate or on both components, wherein, in a junction region between the shaft and the annular pressure plate, at least two recesses or holes are present, the at least two recesses or holes being axially extending, wherein the at least two recesses or holes are arranged along a circular line of the annular pressure plate in an at least partially irregularly distributed manner and form different angles between them.

* * * * *